(12) United States Patent
Schinner (10) Patent No.: US 7,345,774 B2
(45) Date of Patent: Mar. 18, 2008

(54) APPARATUS AND METHOD FOR ADAPTING IMAGE SENSOR ASPECT RATIO TO PRINT ASPECT RATIO IN A DIGITAL IMAGE CAPTURE APPLIANCE

(75) Inventor: Charles E. Schinner, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1001 days.

(21) Appl. No.: 10/053,456

(22) Filed: Oct. 26, 2001

(65) Prior Publication Data

US 2003/0086133 A1 May 8, 2003

(51) Int. Cl.
*G06F 15/00* (2006.01)

(52) U.S. Cl. .............. 358/1.12; 358/1.15; 348/207.2; 348/221.1

(58) Field of Classification Search .............. 358/1.18, 358/1.2, 1.12, 1.15; 348/207.2, 221.1
See application file for complete search history.

(56) References Cited

U.S. PATENT DOCUMENTS

| | | | | |
|---|---|---|---|---|
| 5,619,738 A | * | 4/1997 | Petruchik et al. | 396/311 |
| 5,800,341 A | * | 9/1998 | McKenna et al. | 600/109 |
| 6,297,874 B1 | * | 10/2001 | Ikeda et al. | 355/40 |
| 6,310,648 B1 | * | 10/2001 | Miller et al. | 348/333.05 |
| 6,532,039 B2 | * | 3/2003 | Anderson | 348/231.3 |
| 6,618,078 B1 | * | 9/2003 | Budrys | 348/207.99 |
| 6,650,366 B2 | * | 11/2003 | Parulski et al. | 348/231.6 |
| 6,806,978 B1 | * | 10/2004 | Tamura et al. | 358/1.15 |
| 6,985,248 B2 | * | 1/2006 | Parulski et al. | 358/1.16 |
| 2001/0004406 A1 | * | 6/2001 | Enomoto | 382/282 |
| 2001/0005222 A1 | * | 6/2001 | Yamaguchi | 348/223 |
| 2001/0022624 A1 | * | 9/2001 | Tanaka et al. | 348/333.02 |
| 2003/0095197 A1 | * | 5/2003 | Wheeler et al. | 348/241 |
| 2003/0177448 A1 | * | 9/2003 | Levine et al. | 715/530 |

* cited by examiner

*Primary Examiner*—Twyler Lamb Haskins
*Assistant Examiner*—Mark R. Milia (57) ABSTRACT

An apparatus and method for adapting a sensor aspect ratio to a print aspect ratio in a digital image capture device is disclosed In one embodiment, the invention is an apparatus for capturing digital images, comprising an image sensor including a plurality of image capture elements, each of the image capture elements configured to capture image data, an input element for communicating print size information to the apparatus, and logic for determining which of the plurality of image capture elements correspond to the print size.

21 Claims, 10 Drawing Sheets

APPARATUS AND METHOD FOR ADAPTING IMAGE SENSOR ASPECT RATIO TO PRINT ASPECT RATIO IN A DIGITAL IMAGE CAPTURE APPLIANCE

TECHNICAL FIELD

The present invention relates generally to digital photography, and, more particularly, to an apparatus and method for adapting the aspect ratio of an image capture sensor to an aspect ratio of a printed image in a digital image capture appliance.

BACKGROUND OF THE INVENTION

With the proliferation of low cost microprocessors, memory and image capture electronics, digital cameras are gaining in popularity and are becoming more and more widely available to a larger number of consumers. One of the advantages that a digital camera enjoys over a conventional film camera is that when a digital camera captures an image, the image is stored electronically in a memory element associated with the camera and is available for further electronic manipulation. For example, it is common to capture an image using a digital camera and then print the captured image. The image can be printed by a printer coupled directly to the digital camera (referred to as appliance mode because no computing device is required between the digital camera and printer). Alternatively, the electronic file that contains the captured image can be transferred to a different processing device for printing. Such a transfer may occur by coupling the digital camera to a computer, such as, for example, a personal computer, or may occur by saving the captured image on a removable memory device and transferring the removable media to another processing device.

Digital cameras typically use a light sensor as an image capture element. For example, a charge coupled device (CCD) array or an array of complementary metal oxide semiconductor (CMOS) sensors can be used to capture light entering the lens of the digital camera. The elements that form the CCD array or the CMOS array each correspond to one picture element (pixel) A typical image sensor includes an array of, for example, 1600×1200 pixels. Such an array of pixels is arranged in an aspect ratio of 4:3 The aspect ratio refers to the proportion between the length and width of an object, such as an image sensor, and, as used below, refers to the proportion between the length and width of an image sensor and a printed image. Other pixel array arrangements are possible, but the 4:3 array is typical, and therefore, will be used for explanation purposes.

As mentioned above, one of the electronic manipulations typically performed on a captured digital image is to print the image. Unfortunately, typical print sizes, such as, for example, but not limited to, 4"×6," 5"×7" and 8"×10" do not correspond to the 4:3 aspect ratio of the image sensor found on a typical digital camera. The 4"×6" print size is a 2:3 aspect ratio, the 5"×7" print size is a 2.5:3.5 aspect ratio and the 8"×10" is a 4:5 aspect ratio. Furthermore, different regions in the world will have different standard print sizes having different aspect ratios from those described above. To compensate for this aspect ratio difference between the image sensor and the print size, the printer can automatically edit (typically referred to as "cropping') the electronic image to fit the desired print size. Unfortunately, this prevents the user of the digital camera, particularly when the digital camera is used in appliance mode, from choosing the portions of the captured image that will be cropped Therefore, there is a need in the industry for a way of allowing the user of a digital camera to determine the print area of an image that is captured using a digital camera that has an image sensor having a particular aspect ratio and that is printed using a print size that has an aspect ratio different from the aspect ratio of the image sensor.

SUMMARY OF THE INVENTION

The invention is an apparatus and method for adapting a sensor aspect ratio to a print aspect ratio in a digital image capture device. In one embodiment, the invention is an apparatus for capturing digital images, comprising an image sensor including a plurality of image capture elements, each of the image capture elements configured to capture image data, an input element for communicating print size information to the apparatus, and logic for determining which of the plurality of image capture elements correspond to the print size.

Related methods of operation and computer readable media are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The present invention, as defined in the claims, can be better understood with reference to the following drawings. The components within the drawings are not necessarily to scale relative to each other, emphasis instead being placed upon clearly illustrating the principles of the present invention.

FIGS. 5A-5F are graphical examples of the image capture templates described above with respect to FIG. 4.

DETAILED DESCRIPTION OF THE PREFERRED EMBODIMENT

The invention described below is applicable to any digital camera that uses an image sensor that includes pixels arranged in an aspect ratio different from the aspect ratio of a desired, or selected, image print size. Furthermore, the invention is applicable to both CCD image sensors and to CMOS image sensors.

The system and method for adapting a sensor aspect ratio to a print aspect ratio can be implemented in hardware, software, firmware, or a combination thereof In the preferred embodiment(s), the invention is implemented using a combination of hardware and software or firmware that is stored in a memory and that is executed by a suitable instruction execution system The hardware portion of the invention can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. The software portion of the invention can be stored in one or more memory elements and executed by a suitable general purpose or application specific processor.

The aspect ratio adapting software, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 1:
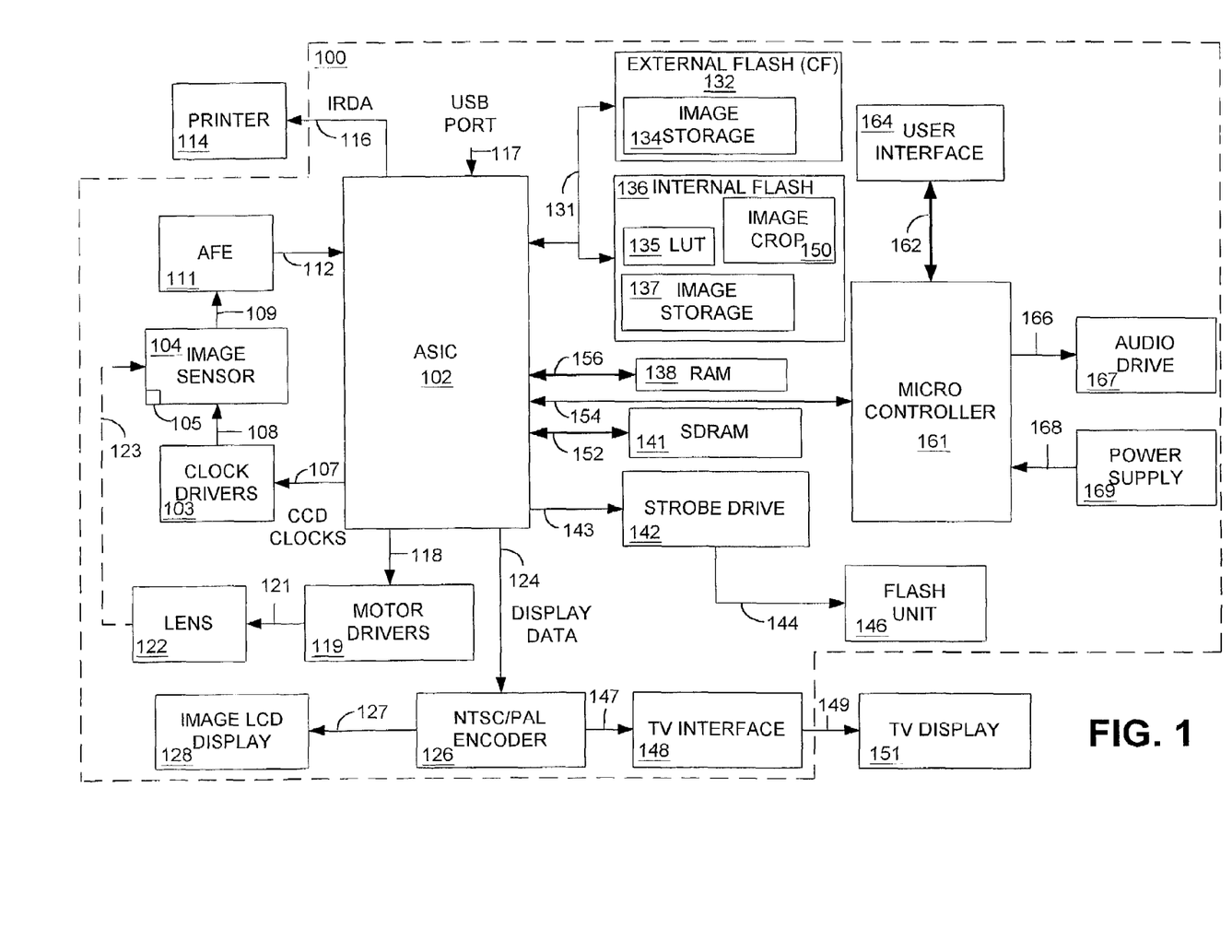
FIG. 1 is a block diagram illustrating a digital camera constructed in accordance with an embodiment of the invention.

FIG. 1 is a block diagram illustrating a digital camera 100 constructed in accordance with an embodiment of the invention. In the implementation to be described below, the digital camera 100 includes an application specific integrated circuit (ASIC) 102 that executes the image crop logic 150 of the invention. As will be described below, the image crop logic 150 can be software that is stored in memory and executed by the ASIC 102 In an alternative embodiment, the image crop logic may be implemented in firmware, which can be stored and executed in the ASIC 102. Further, while illustrated using a single ASIC 102, the digital camera 100 may include additional processors, digital signal processors (DSPs) and ASICs.

The ASIC 102 may also include other elements that are omitted for simplicity The ASIC 102 controls the function of various aspects of the digital camera 100. The ASIC 102 couples to a printer 114 via, for example, a wired, wireless or an infrared (IR) connection 116 and also includes a universal serial bus (USB) port 117, for connection to other processing devices, such as a personal computer (not shown). The ASIC 102 couples to a clock driver element 103 via connection 107. The clock driver element 103 couples to an image sensor 104. The image sensor 104 may comprise a charge coupled device (CCD) array or an array of complementary metal oxide semiconductor (CMOS) sensors. Regardless of whether the image sensor 104 comprises an array of individual CCD elements or CMOS sensors, each of the elements in the array comprises a pixel (picture element) of the image sensor 104. An exemplar image capture element, or pixel, is indicated using reference numeral 105 Each element 105 corresponds to a pixel in the image sensor 104. The pixels in the image sensor 104 are typically arranged as an array having a particular aspect ratio. For example, a typical array comprises 1600 pixels in length and 1200 pixels in height Such an array has a length to height aspect ratio of 4:3.

The image sensor 104 captures an image of a subject by converting light into electrons, and sends this image via connection 109 to an analog front end processor 111. The analog front end processor 111 typically includes an analog-to-digital converter for converting the analog signal received from the image sensor 104 into a digital signal and provides this digital signal as image data via connection 112 to the ASIC 102 for image processing.

The ASIC 102 couples via connection 118 to one or more motor drivers 119. The motor drivers 119 control the operation of various parameters of the lens 122 via connection 121. For example, lens controls, such as zoom, focus, aperture and shutter operations can be controlled by the motor drivers 119. The connection 123 between the lens 122 and the image sensor 104 is shown as a dotted line to illustrate the operation of the lens 122 focusing on a subject and communicating that information to the image sensor 104, which captures the image provided by the lens 122.

The ASIC 102 also sends display data via connection 124 to a national television system committee (NTSC)/phase alternate line (PAL) encoder 126, although, depending on the application, other standards for displaying display data may be used. The encoder 126 converts the display data from the ASIC 102 into a signal that can be shown on image display 128 via connection 127 The encoder 126 also converts the output of the ASIC 102 on connection 124 to information that can be supplied to the television interface 148 via connection 147. The image display 128, which can be, for example a liquid crystal display (LCD) or other display, displays the image to the user of a digital camera 100, and is typically the display located on the digital camera 100. Depending on the configuration of the digital camera 100, the image shown to a user on the display 128 may be shown before the image is captured and processed, or after the image is captured and processed. The TV interface 148 is typically one or more connections and/or interfaces that allow the output of the ASIC 102 to be displayed on a conventional television 151 via connection 149.

The ASIC 102 also supplies a strobe drive signal via connection 143 to the strobe drive element 142. The strobe drive element 142 activates the flash unit 146 via connection 144 when it is determined that flash photography is either necessary or desired.

The ASIC 102 couples to a microcontroller 161 via connection 154. The microcontroller 161 can be a specific or a general purpose microprocessor that controls the various operating aspects and parameters of the digital camera 100. For example, the microcontroller 161 is coupled to a user interface 164 via connection 162. The user interface 164 may include, for example but not limited to, a keypad, one or more buttons, a mouse or pointing device, a shutter release, and any other buttons or switches that allow the user of the digital camera 100 to input commands. The microcontroller 161 also couples via connection 166 to an audio drive 167. The audio drive 167 provides audible signals to the user of the digital camera 100. The microcontroller 161 also couples via connection 168 to a power supply 169. The power supply 169 may be, for example but not limited to, one or more batteries, an AC adapter, or any other type of power supply for powering the digital camera 100.

The ASIC 102 also couples to one or more different memory elements, to be described below with particular reference to the type of memory to which the ASIC 102 is coupled over various connections. It should be noted that while specific types of memory are denoted below, the digital camera 100 may employ various other types of memory not specifically described herein. For example, the various memory elements may comprise volatile, and/or non-volatile memory, such as, for example but not limited to, random access memory (RAM), read-only memory (ROM), and flash memory Furthermore, the memory elements may be either internal to the digital camera 100 or may be removable memory media, and may also comprise memory distributed over various elements within the digital camera 100. All such memory types are contemplated to be within the scope of the invention.

The ASIC 102 couples to static dynamic random access memory (SDRAM) 141 via connection 152. The SDRAM 141 houses the various software and firmware elements and components (not shown) that allow the digital camera 100 to perform its various functions. The ASIC 102 also couples to RAM 138 via connection 156. The RAM 138 generally provides temporary storage for the images to be described below When the invention is implemented in software, the software code (i.e., the image crop logic 150) is typically stored in the internal memory 136 (ROM) and transferred to the RAM 138 to enable the efficient execution of the software in the ASIC 102 The internal memory can be, for example, flash memory.

The ASIC 102 also couples via connection 131 to an external memory 132, which can also be flash memory. As will be described in further detail below, the external memory 132, which can be, for example, compact flash memory, and the internal memory 136, may provide image storage 134 and 137, respectively, for captured images, as will be described below. The internal memory 136 also includes a look-up table (LUT) 135. In accordance with an embodiment of the invention, the LUT 135 includes information regarding the print size aspect ratios, to be described in further detail below, and may contain information in multiple formats, such as print size aspect ratios in English and metric units Further, individual look-up tables having different unit conventions may be stored in the internal memory 135.

By implementing various embodiments of the invention, the invention allows a user of the digital camera 100 to select the portion of a captured image that will be printed, thereby allowing a user of the camera to view a captured image and have that image printed as captured. Aspects of the invention adapt the aspect ratio of a printed image to the aspect ratio of the image sensor 104 in accordance with input from a user. In accordance with an embodiment of the invention, the user of the digital camera 100 enables the image crop logic 150 by inputting an appropriate command into the user interface 164 The ASIC 102 then executes the image crop logic 150 so that, as an image is detected and captured by the image sensor 104, an appropriate aspect ratio modification is made to the image file corresponding to that image, so that a printed image corresponding to the detected and captured image will have an aspect ratio adapted to the aspect ratio of the image detected and captured by the image sensor 104.

The image crop logic 150 may be invoked by a user of the digital camera 100 either before or after the captured image is processed by the ASIC 102. Further, the image crop logic may function with either an addressable image sensor or a non-addressable image sensor. An addressable image sensor is one in which individual sensor elements can be enabled and disabled. A non-addressable image sensor is one in which all elements are always active and cannot be individually controlled When implemented using a non-addressable image sensor, the image crop logic may be implemented to discard information from sensor elements that reside out of the desired aspect ratio. Alternatively, the image crop logic 150 may be implemented to process all the information from all of the sensor elements and then discard the undesired information. When implemented using an addressable image sensor, the image crop logic may be configured to enable only those sensor elements in the image sensor that reside within the desired aspect ratio. In this manner, the image crop logic 150 can be used to adapt the aspect ratio of the printed image to the aspect ratio of the image sensor 104. These embodiments will be described in detail below.

It should be noted that, although included in the general description of the digital camera 100 of FIG. 1, the printer 114, TV display 151 and portions of the external memory element 132 are peripheral to the digital camera 100.

Figure 2A:
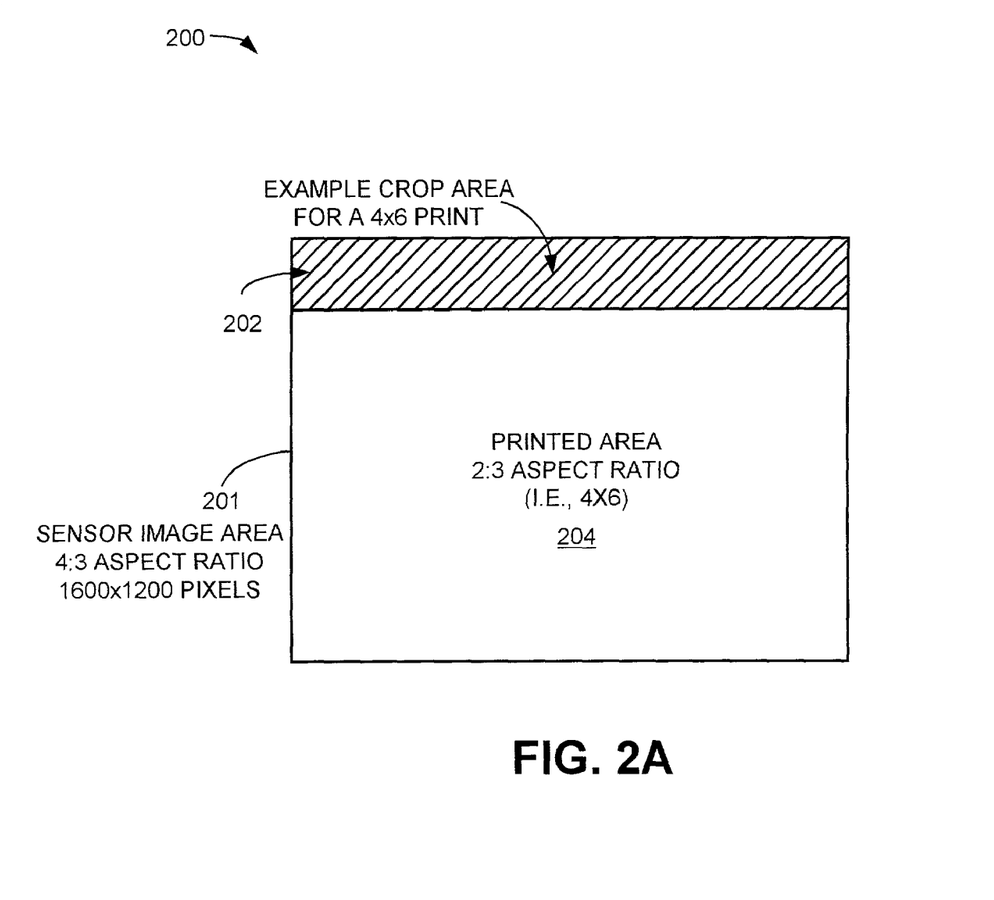
FIGS. 2A and 2B are block diagrams illustrating the aspect ratio differences between the image sensor and two different printed image sizes.
Figure 2B:
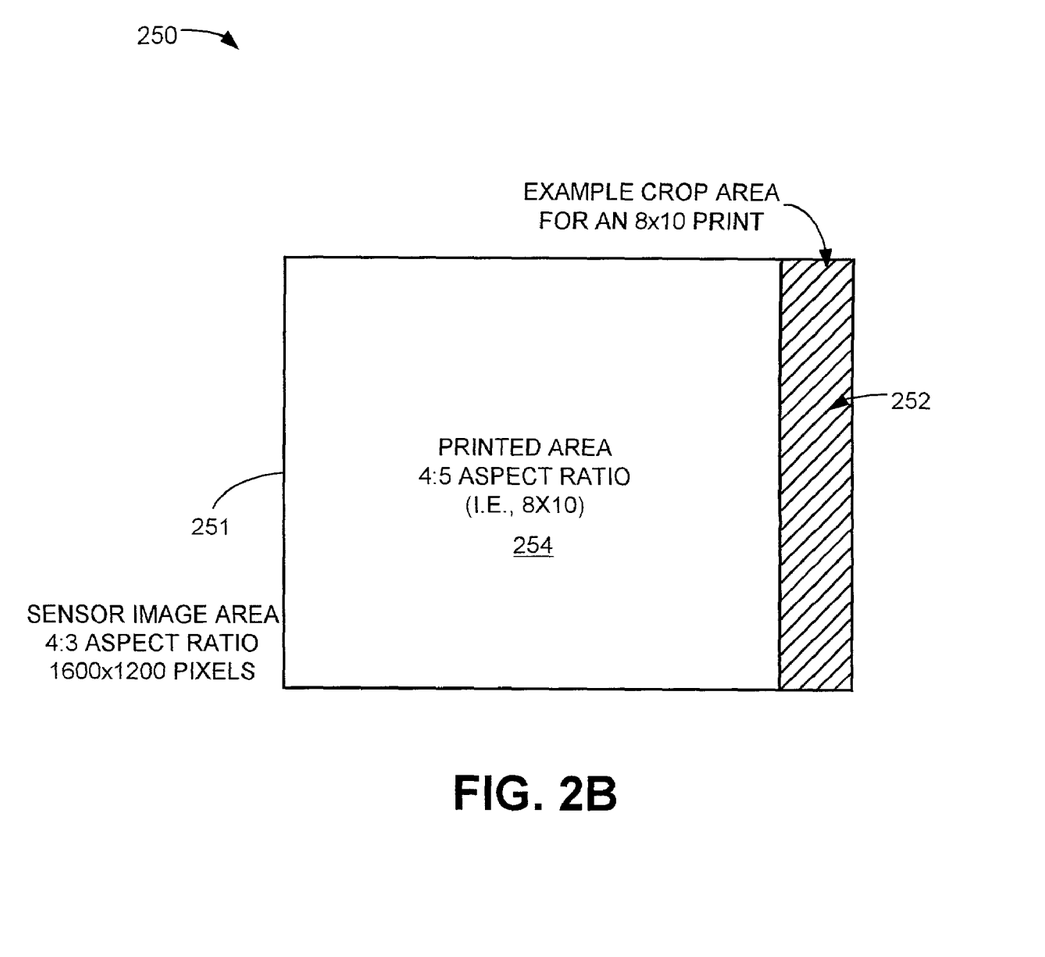

FIGS. 2A and 2B are block diagrams illustrating the aspect ratio difference between the image sensor 104 and two different printed image sizes. FIG. 2A illustrates a block diagram 200 in which the image sensor area 201, which is a 4:3 aspect ratio, and in which the printed area (of, for example a 4×6 print) has an aspect ratio of 2:3. While the ratio used to describe the image sensor aspect ratio is referred to as length width, the print area for a typical printed photograph is typically referred to using a ratio of the short axis and the long axis (referred to as "short axis.long axis."). This convention will be followed in this document, so the aspect ratio of the image sensor (1600×1200 pixels) is 4:3, while the aspect ratio of a printed image (i.e., 4"×6") is 2:3.

As shown in FIG. 2A, the 2:3 aspect ratio print area 204 occupies only a portion of the total available image sensor area 201. The area 202 indicated by the cross hatched lines denotes the area that would be automatically cropped by the printer when a 4×6 inch print is printed from image data obtained using all of the image sensor elements represented in area 201. The cropped elements 202 can be as shown in FIG. 2A, can be grouped below the print area 204, or can be distributed between the top and bottom edges of the graphical image 200. Importantly, when an image captured by a digital camera that does not include the invention is printed, the printer determines the area that will be cropped. Unfortunately, this makes it difficult for the user of the digital camera to frame a photograph and capture a desired image because the user has no control over the portion of the captured image that will be cropped by the printer.

FIG. 2B is a block diagram 250 including the total image sensor area 251 from which an 8×10 print will be printed. An 8×10 print would include pixels in the printed area 254 and has an aspect ratio of 4:5. As shown in FIG. 2B, the area 252 indicated by the crossed hatched lines will be cropped when an 8×10 image is printed using an image sensor array that has an aspect ratio of 4:3. As mentioned above with respect to FIG. 2A, the area 252 may also be located on the opposite side of the printed area 254, or can be distributed on both sides of the printed area 254. From FIGS. 2A and 2B, it is clear that when a, for example, 4×6 inch print or an 8×10 inch print, is desired from an image captured by an image sensor having an aspect ratio of 4:3, the data captured by some portion of the pixels in the image sensor area will not be used.

Table 1 below illustrates the pixel cropping applied to an image sensor array having a 4:3 aspect ratio for five common U.S. print sizes. From Table 1 it is clear that the data captured and processed from some portion of the available pixels in an array having a 4:3 aspect ratio will not be used. This consumes valuable processing and storage resource available on the digital camera 100.

TABLE 1

| Print Size | Pixels Used | Pixels Cropped Out Using a 1200 × 1600 Image Sensor. 1200 × 1600 minus Pixels Used |
|---|---|---|
| 4 × 6 | 1064 × 1596 | 136 × 4 |
| 5 × 7 | 1140 × 1596 | 60 × 4 |
| 8 × 10 | 1200 × 1500 | 0 × 100 |
| 11 × 14 | 1199 × 1526 | 1 × 74 |
| 16 × 20 | 1200 × 1500 | 0 × 100 |

Figure 3:
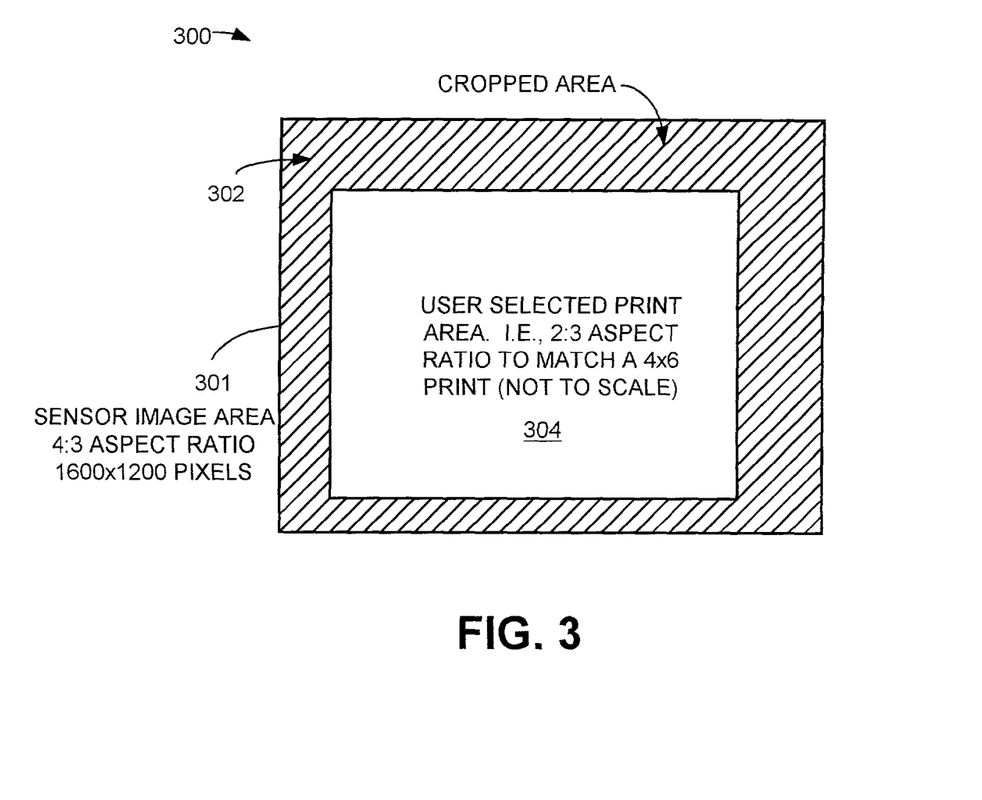
FIG. 3 is a block diagram illustrating an embodiment of the invention in which an arbitrary user selected print area is selected from the available sensor elements in an image sensor area.

FIG. 3 is a block diagram 300 illustrating an embodiment of the invention in which an arbitrary user selected print area 304 is selected from the available sensor elements in an image sensor area 301. As shown in FIG. 3, the user selected print area 304 has an aspect ratio of 2:3, which corresponds to a 4"×6" print. In this manner, the image crop logic 150 (FIG. 1) allows a user of the digital camera 100 to either automatically default to, or allow the user to define an arbitrary print area. Further, it should be mentioned that the user selected print area 304 can use any of the available sensor elements in the image sensor area 301.

Figure 4:
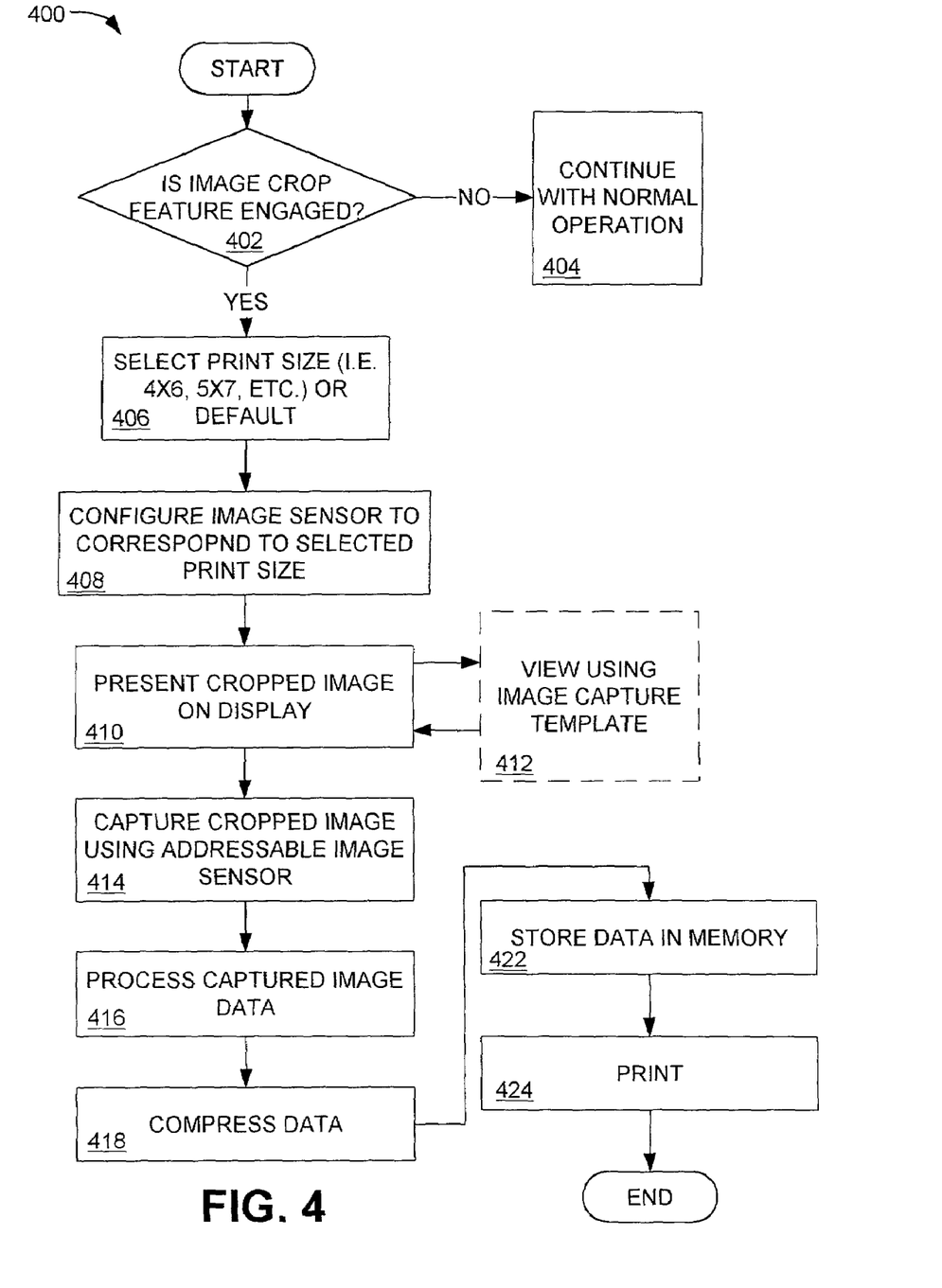
FIG. 4 is a flow chart illustrating a first embodiment of the image crop logic of the invention in which an image sensor having individually addressable elements is used.

FIG. 4 is a flow chart 400 illustrating a first embodiment of the image crop logic of the invention in which an image sensor having individually addressable elements is used. Any process descriptions or blocks in the flow charts to follow should be understood as representing modules, segments, or portions of code which include one or more executable instructions for implementing specific logical functions or steps in the process, and alternative implementations are included within the scope of the preferred embodiment of the present invention. For example, functions may be executed out of order from that shown or discussed, including substantially concurrently or in reverse order, depending on the functionality involved, as would be understood by those reasonably skilled in the art of the present invention.

Figure 5A:
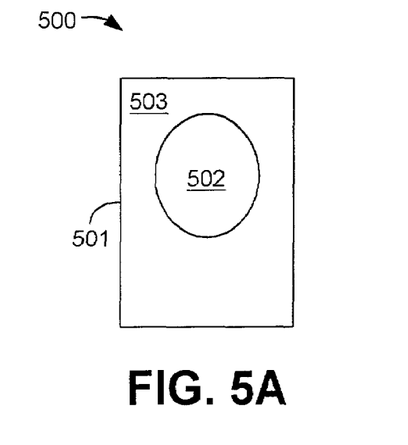

In block 402, the ASIC 102 determines whether the image crop feature of the invention is enabled. If the image crop feature is not enabled then, in block 404 the digital camera 100 continues with normal operation. If it is determined in block 402 that the image crop feature is enabled then, in block 406, the user of the digital camera 100 selects a desired print size via the user interface 164. This can be accomplished by the user activating appropriate controls on the user interface 164 to select the desired print size from a list of available print sizes stored in the look-up table 135 (FIG. 1). Alternatively, a default print size may be set and automatically enabled In block 408, the image crop logic 150 configures the image sensor 104 to correspond to the selected print size. For example, in this embodiment in which the image sensor 104 includes individually addressable sensor elements, only those sensor elements that are required to match the aspect ratio of the selected print size to the image sensor aspect ratio are enabled. Therefore these selected elements are the only elements that will capture the image. Referring briefly back to FIG. 3, this is illustrated where the user selected print area 304 represents the only sensor elements that are enabled. The sensor elements that are included in the region 302 are disabled, and therefore will not capture any portion of the image In this manner, a reduced data set is captured, and thereby reduces the amount of resources necessary for processing the captured data in the digital camera 100. Furthermore, by capturing information using a reduced number of sensor elements, or pixels, the processing efficiency in the digital camera 100 can be improved Returning to FIG. 4, in block 410, the cropped image is presented to a user of the digital camera 100 via the image display 128. The cropped image can be displayed to a user whereby only the information that is captured by the elements of the image sensor 104 are displayed to the user or, as shown in optional step 412, the cropped image can be shown to a user using an image capture template (to be described with respect to FIGS. 5A-5F). The image capture templates can be stored in the internal memory 136 and be accessible by a user of the digital camera 100 via the user interface 164.

FIGS. 5A-5F are graphical examples of the image capture templates described above with respect to FIG. 4. FIG. 5A shows an image capture template 500 that includes an aperture 502 that represents a portion of the total number of image sensor elements 501. The aperture 502 can be used to, for example, frame the head of a subject for use in generating a passport photograph. Using the image capture template 500 enables the user of the digital camera to capture a desired portion of an image, while eliminating the need to capture information using the image sensor elements in region 503. The image capture templates can be automatically controlled or can be user selectable, and are all available to a user of the digital camera 100

Figure 5B:
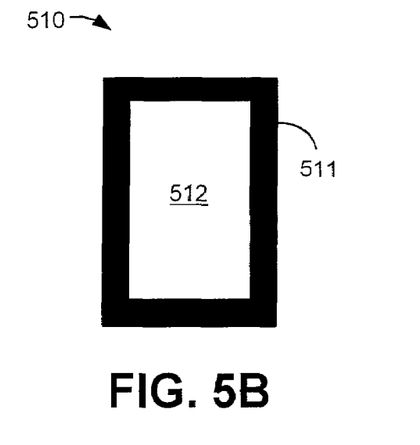

FIG. 5B illustrates an image capture template 510 in which a border 511 surrounds the image capture area 512. Referring back to FIG. 3, the border area 511 might correspond to, for example, the area 302 of FIG. 3 in which no image is captured and the image capture area 512 can correspond to, for example, the user selected print area 304 of FIG. 3.

Figure 5C:
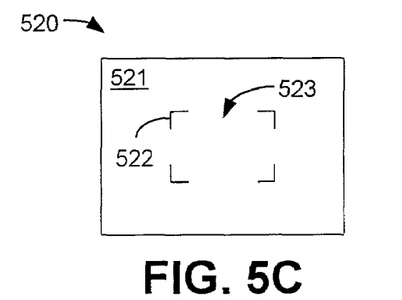

FIG. 5C illustrates an image capture template 520 in which the total image capture area 521 includes indicators, an exemplar one of which is illustrated using reference numeral 522, that surround an auto focus/auto exposure region 523.

Figure 5D:
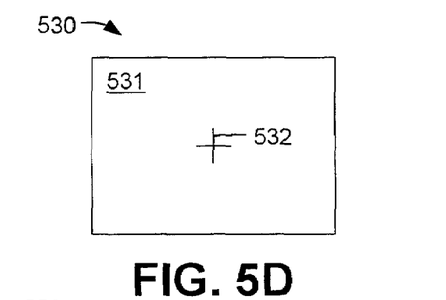

FIG. 5D is a graphical illustration of an image capture template 530 in which a crosshair 532 is located in the center of image area 531.

Figure 5E:
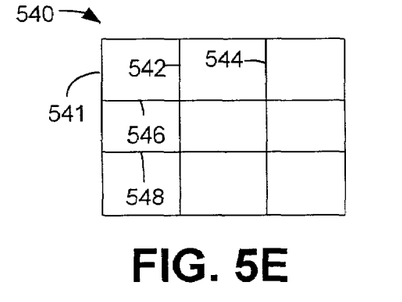

FIG. 5E is an image capture template 540 in which the image capture area 541 is divided by vertical lines 542 and 544, and by horizontal lines 546 and 548 into regions, commonly referred to as the "Golden Rule" compositional aid.

Figure 5F:
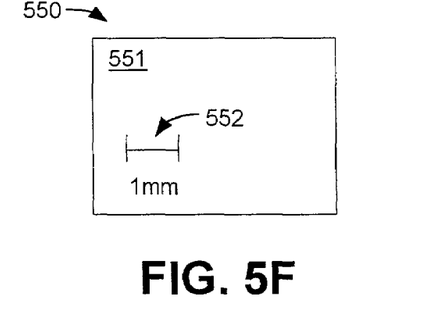

FIG. 5F is an image capture template 550 in which the image capture area 551 includes a scale indicator 552. This assumes a predefined focal length and subject distance.

Referring back to FIG. 4, in block 414, the cropped image that was displayed to a user on the image display 128 is captured by the image sensor 104. In block 416, the captured image is processed by the ASIC 102, compressed in block 418, and stored in block 422. The captured image can be stored either in the image storage region 137, in the internal flash memory 136, or in the image storage region 134 in the external flash memory 132. In block 424, the captured image that is stored in the memory is printed.

Figure 6A:
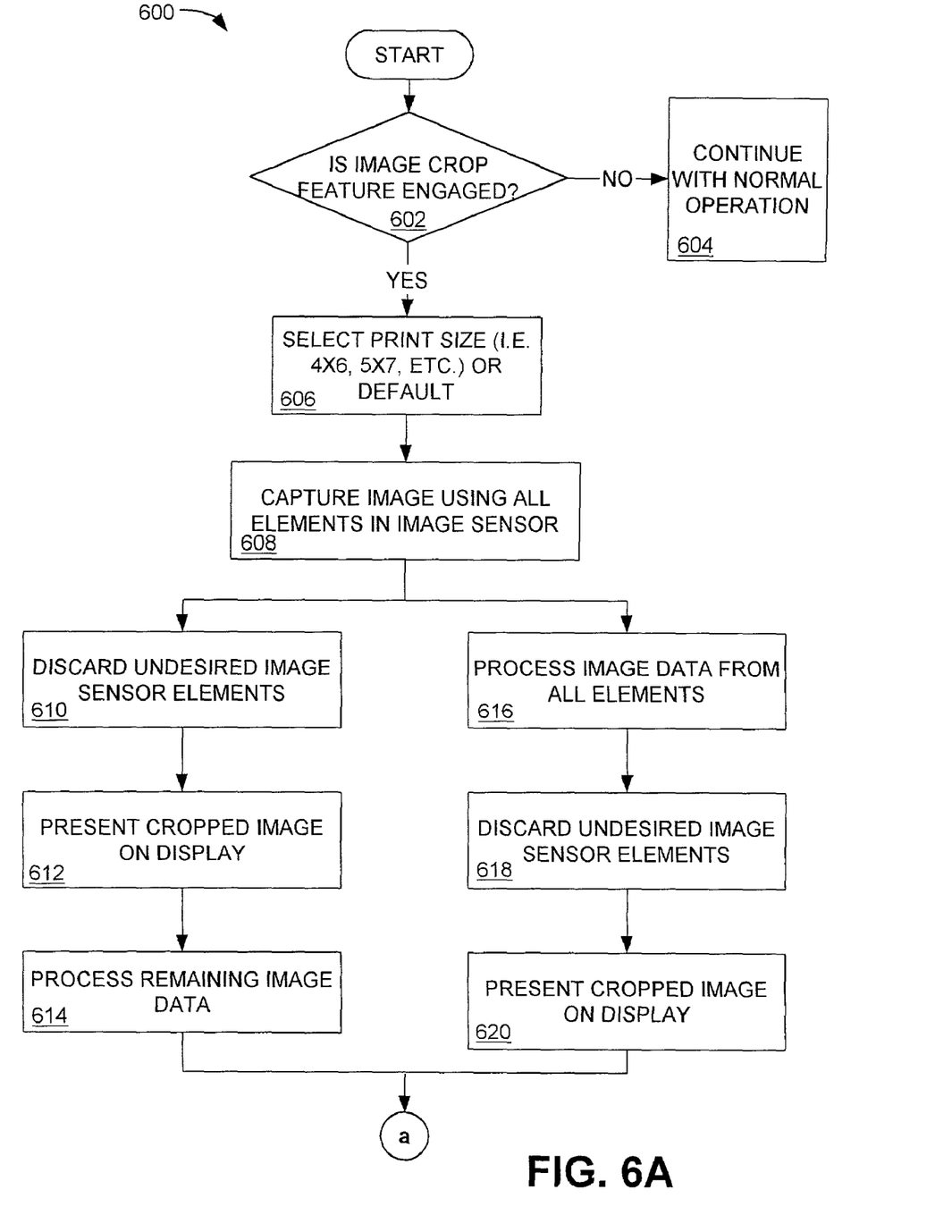
FIGS. 6A and 6B collectively illustrate an alternative embodiment of the image crop logic in which a non-addressable image sensor is employed.
Figure 6B:
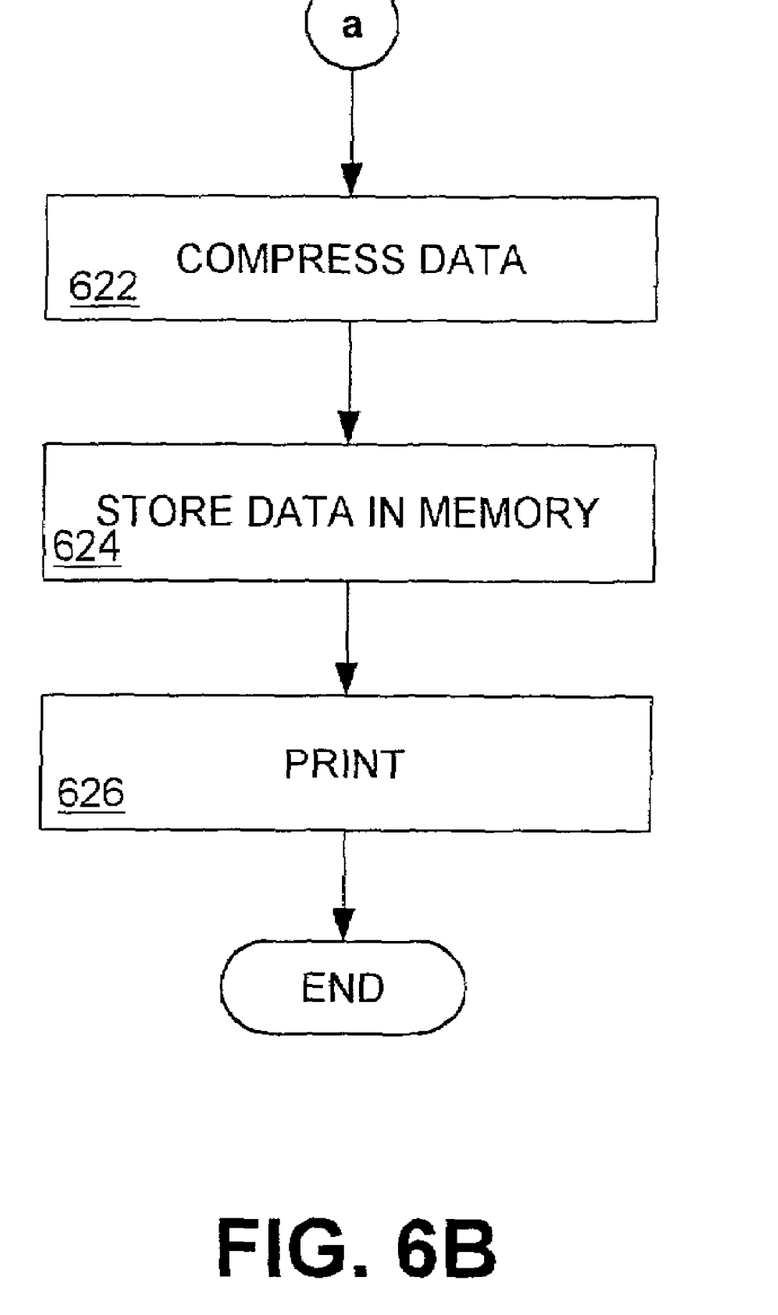

FIGS. 6A and 6B collectively illustrate an alternative embodiment of the image crop logic 150 in which a non-addressable image sensor 104 is employed. In block 602, it is determined whether the image crop feature is enabled. If the image crop feature is not enabled then, in block 604, the normal operation of the digital camera 100 continues. If, however, in block 602 it is determined that the image crop feature is enabled then, in block 606, the user of the digital camera 100, via the user interface 164, selects the desired print size. If no print size is selected, then a default print size can be automatically selected. The different print sizes are stored in the lookup table 135 in the internal flash memory 136, as described above In block 608, because a non-addressable image sensor 104 is used, the image sensor 104 captures the image using all elements in the sensor. At this point, depending on the manner in which the image crop logic 150 is implemented, either of two different processing paths may be taken. It should be mentioned that the two different processing paths may be implemented as two different modes of operation of the digital camera 100

A first processing path includes blocks 610, 612 and 614. In block 610, the information captured by image sensor elements that fall outside of the user selected print area (i.e., the data captured by any image sensor elements in the cropped area 302 of FIG. 3) are discarded. Next, in block 612, the cropped image is presented to a user of the digital camera 100 via the image display 128, and in block 614 this cropped image data is processed by the ASIC 102.

In an alternative implementation, and as shown below with respect to blocks 616, 618 and 620, it is possible to process the image data from all the elements and then discard the undesired data. This implementation is slightly more processor intensive than that described above. In block 616, all the data collected from all of the image sensor elements is processed in the ASIC 102.

In block 618 any non-desired information (i.e., sensor data collected from image sensor elements in the cropped area 302 of FIG. 3) is discarded. In block 620, the cropped image is displayed to a user of the digital camera 100 via the image display 128.

Figure 7A:
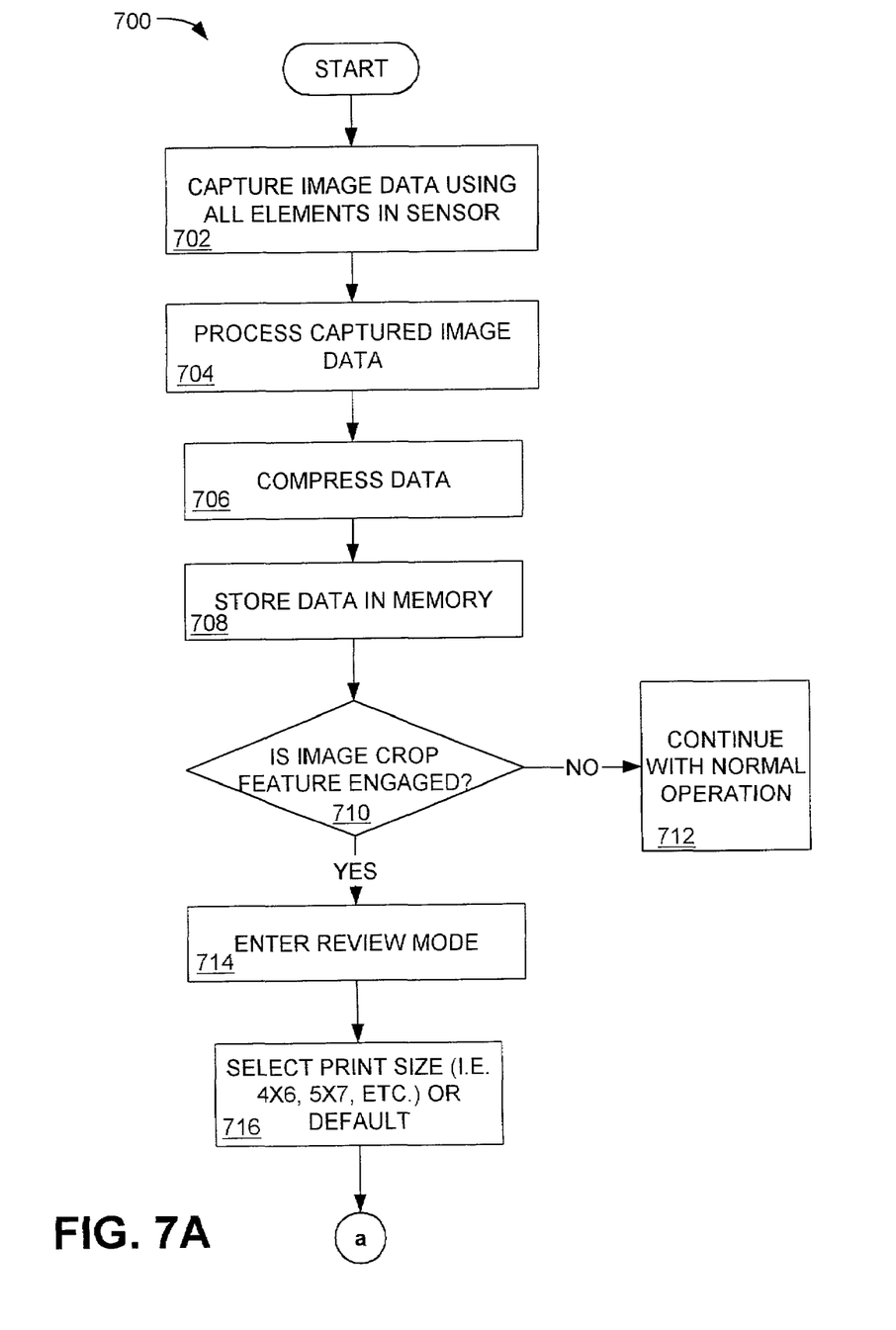
FIGS. 7A and 7B collectively illustrate a third embodiment of the invention in which the image crop logic is implemented after an image is captured.
Figure 7B:
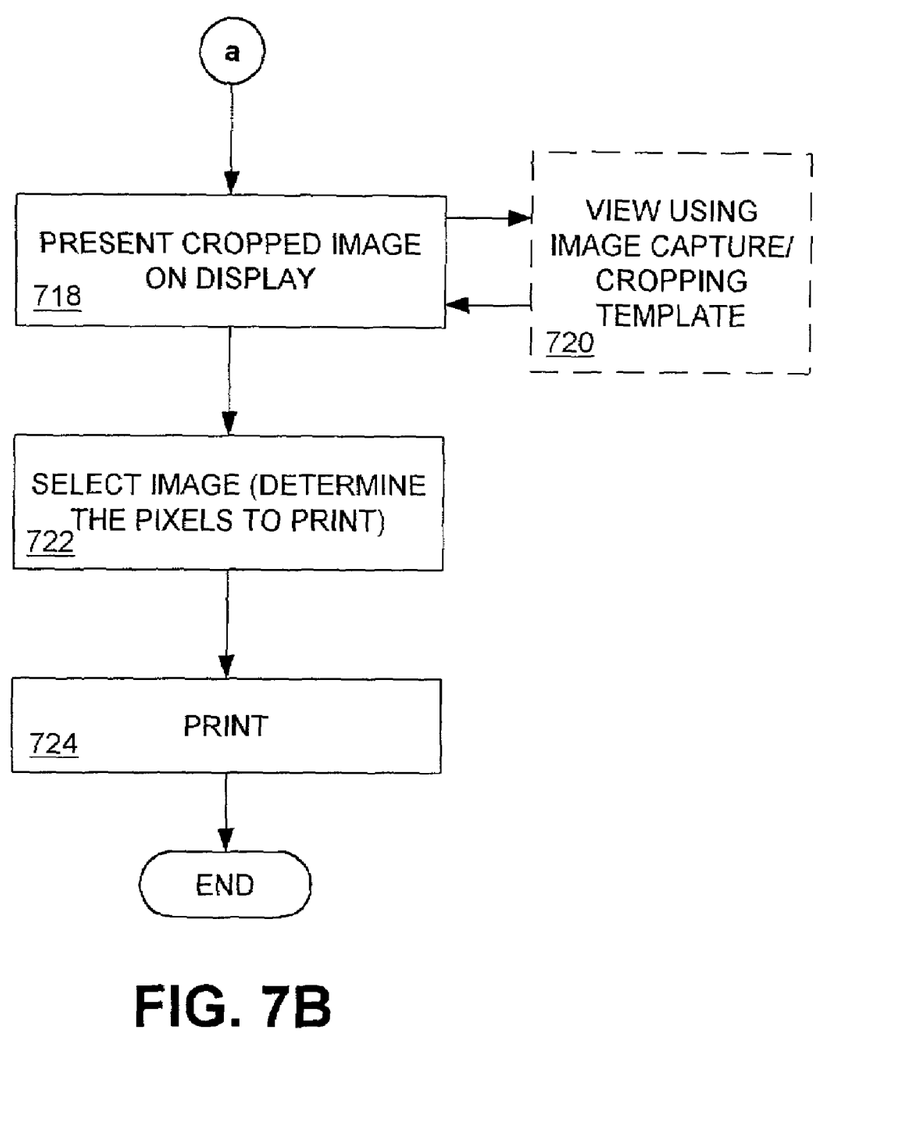

Referring now to FIG. 6B, in block 622 the cropped image sensor data is compressed, and in block 624 the data is stored in either the image storage region 137 of the internal flash memory 136 or in the image storage region 134 of the external flash memory 132 In block 626, the image is printed FIGS. 7A and 7B collectively illustrate a third embodiment of the invention in which the image crop logic 150 is implemented after an image is captured.

In block 702, an image is captured using all the elements of an image sensor 104. In block 704, all the captured information is processed by the ASIC 102 and, in block 706, this image data is compressed. In block 708, this image data is stored in the image storage region 137 of the internal flash memory 136, or possibly in the image storage region 134 of the external flash memory 132.

In block 710, it is determined whether the image crop feature is enabled. If not enabled, then in block 712 the digital camera 100 continues with its normal operation. If, in block 710, it is determined that the image crop feature is enabled then, in block 714, the digital camera 100 enters what is referred to as a "review mode." The review mode enables a user of the digital camera 100 to view captured images on the image display 128.

In block 716 a user of the digital camera 100, via the user interface 164, selects a desired print size, or if not selected, the digital camera 100 reverts to a default print size. The print size is selected by a user from the various print sizes stored in the lookup table 135.

In block 718, the cropped image that conforms to the selected print size is displayed to a user on the image display 128. For example, and as shown in block 720, the image capture template 510 illustrated in FIG. 5B can be used to show the captured image to a user on the image display 128 In block 722, the image crop logic 150 selects the image to print and in block 724 the selected image is printed.

While various embodiments of the invention have been described, it will be apparent to those of ordinary skill in the art that many more embodiments and implementations are possible that are within the scope of this invention. For example, while illustrated as using either a CCD image sensor or a CMOS image sensor, other image sensor technologies may be used in conjunction with the invention. All such modifications and variations are intended to be included herein within the scope of this disclosure and the present invention and protected by the following claims.

What is claimed is:

1. An apparatus for capturing digital images, comprising:
   an image sensor including a plurality of image capture elements, each of the image capture elements configured to capture image data;
   an input element for communicating a print size to the apparatus;
   responsive to entry of the print size, means for enabling fewer than all of the plurality of image capture elements to capture the image data; and
   means for matching image capture elements corresponding to the fewer than all of the plurality of image capture elements with an aspect ratio corresponding to the print size.

2. The apparatus of claim 1, wherein a portion of the plurality of image capture elements is used to capture the image data and only the captured image data is presented to a user.

3. The apparatus of claim 1, wherein the print size aspect ratio corresponds to the aspect ratio of the image sensor.

4. The apparatus of claim 1, further comprising means for presenting an image capture template to a user of the apparatus.

5. The apparatus of claim 4, wherein the image capture template provides a visual reference to the plurality of image capture elements that correspond to the selected print size.

6. A method for adapting a print size to a captured image in a digital image capture device, the method comprising the steps of:
   providing an image sensor including a plurality of image capture elements;
   enabling fewer than all of the plurality of image capture elements to capture image sensor data;

matching the fewer than all of the plurality of image capture elements of the image sensor with an aspect ratio corresponding to a selected print size; and presenting the captured image sensor data corresponding to the selected print size to a user of the image capture device.

7. The method of claim 6, further comprising the step of capturing image sensor data using only those image capture elements corresponding to the selected print size.

8. The method of claim 6, further comprising the step of printing the image sensor data corresponding to the selected print size.

9. The method of claim 6, further comprising the steps of:
presenting the image sensor data to a user of the image capture device; and
superimposing an image capture template over the image sensor data, the image capture template providing a visual reference on a display.

10. The method of claim 9, wherein the visual reference corresponds to the image sensor data.

11. The method of claim 9, wherein the image capture template is one of fixed and variable.

12. The method of claim 9, wherein a plurality of image capture templates are made available to a user of the image capture device.

13. The method of claim 6, further comprising the step of presenting a user interface to enable entry of the print size by the user before image capture.

14. A computer readable medium having a program for adapting a print size to a captured image in a digital image capture device, the program including logic for performing the steps of:
enabling fewer than all of a plurality of image capture elements of an image sensor to capture image data;
matching the fewer than all of the plurality of image capture elements of the image sensor with an aspect ratio corresponding to a selected print size; and
presenting the captured image sensor data corresponding to the selected print size to a user of the image capture device.

15. The program of claim 14, further comprising logic for performing the step of capturing image sensor data using only those image capture elements associated with the image sensor that correspond to the selected print size.

16. The program of claim 14, further comprising logic for performing the step of printing the image sensor data corresponding to the selected print size.

17. The program of claim 14, further comprising logic for performing the steps of:
presenting the image sensor data to a user of the image capture device; and
superimposing an image capture template over the image sensor data, the image capture template providing a visual reference on a display.

18. The program of claim 17, wherein the visual reference corresponds to the image sensor data.

19. The program of claim 17, wherein the image capture template is one of fixed and variable.

20. The program of claim 17, further comprising logic configured to present a user interface to enable entry of the print size by the user before image capture.

21. The program of claim 14, further comprising logic configured to present a user interface to enable entry of the print size by the user before image capture.

* * * * *